US011047734B1

(12) United States Patent
Gorsica et al.

(10) Patent No.: US 11,047,734 B1
(45) Date of Patent: Jun. 29, 2021

(54) SYSTEM AND METHOD FOR MEASURING LIGHT SENSOR OUTPUT IN AN ELECTRONIC DEVICE

(71) Applicant: MOTOROLA MOBILITY LLC, Chicago, IL (US)

(72) Inventors: John J. Gorsica, Round Lake, IL (US); Eric J. Hefner, Lombard, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 16/849,786

(22) Filed: Apr. 15, 2020

(51) Int. Cl.
| | |
|---|---|
| *G01J 1/42* | (2006.01) |
| *G01J 1/46* | (2006.01) |
| *G09G 5/12* | (2006.01) |
| *H04N 5/225* | (2006.01) |

(52) U.S. Cl.
CPC .............. *G01J 1/46* (2013.01); *G01J 1/4204* (2013.01); *G09G 5/12* (2013.01); *G01J 2001/4252* (2013.01); *G09G 2360/14* (2013.01); *H04N 5/2257* (2013.01)

(58) Field of Classification Search
CPC ..... G09G 2320/0626; G09G 2360/144; G09G 3/3406; G09G 5/10; G09G 2320/0233; G09G 2330/021; G01J 1/4204; G01J 1/16; G01J 1/44
USPC ........................................ 250/214 R, 214 AL
See application file for complete search history.

(56) References Cited

U.S. PATENT DOCUMENTS 10,950,187 B2 *  3/2021  Kriebernegg ........ G09G 3/3406

OTHER PUBLICATIONS

Miyagawa et al., "Integration-Time Based Computational Image Sensors", ITE Technical Report, vol. 19, No. 65, pp. 37-41, Nov. 1995.
AMS Application Note AN000607, "Behind OLED Proximity Design Considerations, Minimizing Crosstalk and Emitter Placement", v1-00, Jul. 3, 2019.
Silicon Labs (Silabs.com), "Using ADC to measure a current source with no external components", Oct. 7, 2016.

\* cited by examiner

*Primary Examiner* — Que Tan Le
(74) *Attorney, Agent, or Firm* — Isidore PLLC

(57) ABSTRACT

A method, an electronic device, and a computer program product for measuring light sensor output in an electronic device. The method includes receiving periodic synchronization signals from a display and generating one or more timing signals based on the received periodic synchronization signals. The method further includes tracking a number of timing signals and in response to each timing signal, recording output signals from a light sensor. The output signals correspond to a light level detected by the light sensor. The method further includes accumulating the recorded output signals over a threshold number of timing signals, The method includes determining if a value of the counter is at least equal to or greater than the threshold number. In response to determining that the value of the counter is at least equal to or greater than the threshold number, generating a composite output signal based on the accumulated recorded output signals.

20 Claims, 6 Drawing Sheets

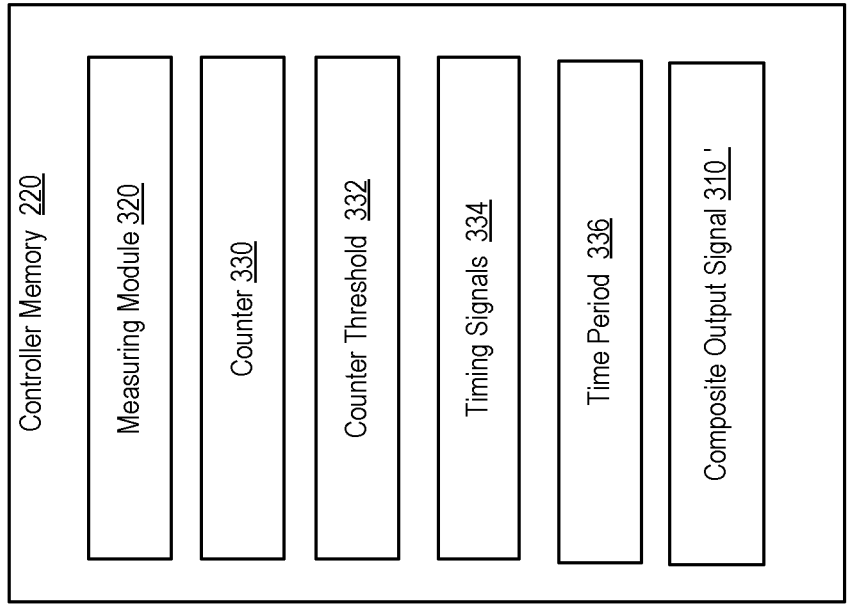
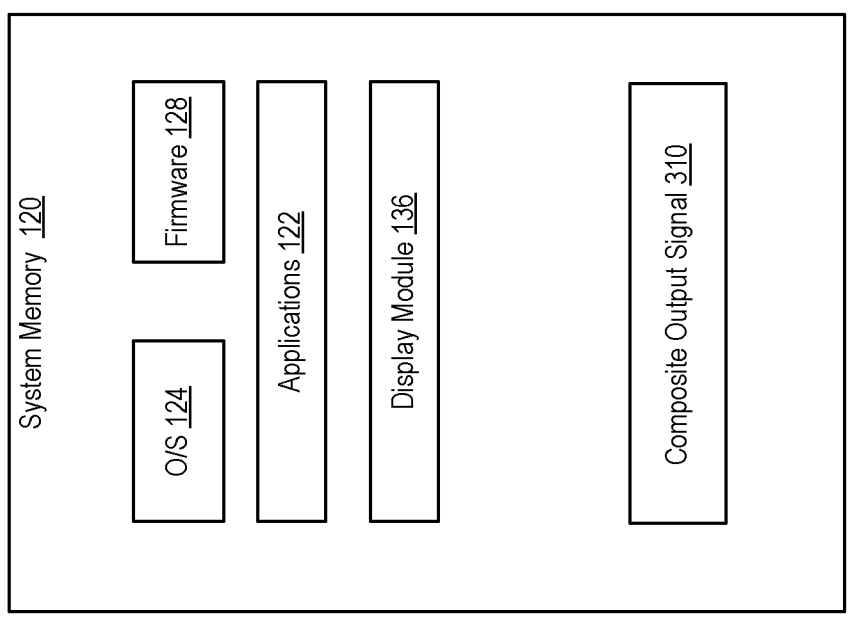
FIG. 3B
FIG. 3A

SYSTEM AND METHOD FOR MEASURING LIGHT SENSOR OUTPUT IN AN ELECTRONIC DEVICE

BACKGROUND

1. Technical Field

The present disclosure generally relates to electronic devices, and in particular to a system and method for measuring light sensor output in an electronic device.

2. Description of the Related Art

Personal electronic devices, such as cell phones, smartphones and other mobile devices enjoy widespread use in today's society. Smartphones can use liquid crystal displays (LCD) and organic light emitting diode (OLED) displays. OLED displays include an organic compound that emits light when an electrical current is applied. OLED displays can be designed in an edge to edge manner where the size of the OLED display is maximized to take up almost the entire front of the smartphone.

Smartphones frequently also include an ambient light sensor and a proximity sensor. The ambient light sensor measures the amount of ambient light present. The smartphone can dim or brighten the display based on the measured ambient light level to adjust the display brightness. A proximity sensor is a sensor able to detect the presence of nearby objects, without any physical contact with the object. Proximity sensors generally include an infrared (IR) emitter and IR light sensor. As one application, proximity sensors are used in smartphones to sense when the smartphone is near the face of a user, such as during a phone call, and trigger disabling of the touchscreen to prevent accidental taps on the touchscreen. Unfortunately, the use of ambient light sensors and proximity sensors with OLED displays causes problems. Light emitted from the OLED display interferes with light measurements by light sensors causing inaccurate measurements.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 3A is a block diagram of example contents of the system memory of a mobile device configured to provide at least one of the novel features of the disclosure, according to one or more embodiments;

FIG. 3B is a block diagram of example contents of a controller memory of a mobile device configured to provide at least one of the novel features of the disclosure, according to one or more embodiments;

DETAILED DESCRIPTION

Figure 1:
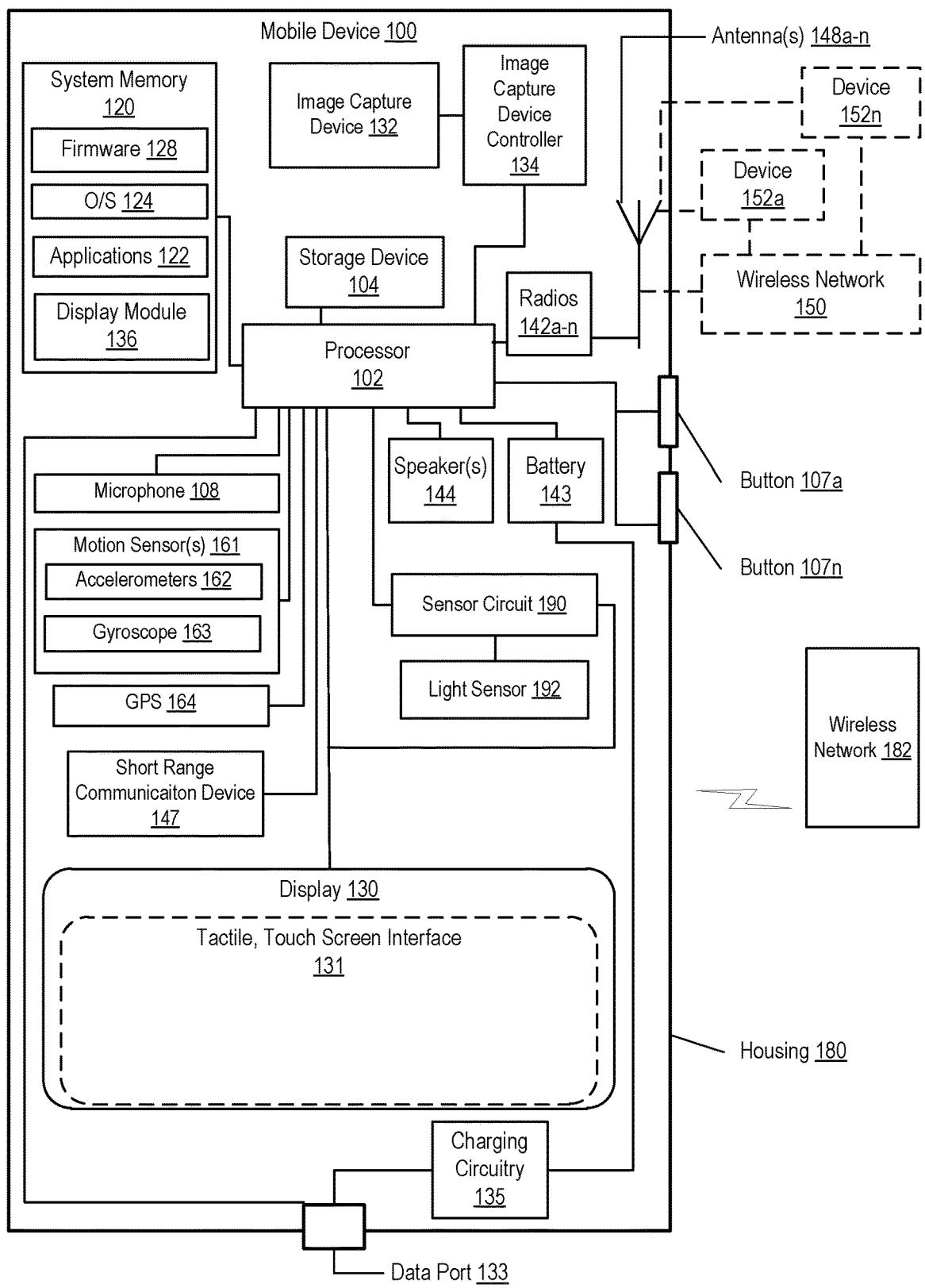
FIG. 1 depicts an example mobile device within which various aspects of the disclosure can be implemented, according to one or more embodiments.

The illustrative embodiments provide a method, an electronic device, and a computer program product for measuring light sensor output in an electronic device. The method includes receiving, via a sensor circuit, periodic synchronization signals from a display of a device and generating one or more timing signals based on the received periodic synchronization signals. The method further includes tracking, via a counter, a number of the timing signals and, in response to each timing signal, recording output signals from a light sensor. The output signals correspond to a current light level detected by the light sensor. The method further includes accumulating the recorded output signals over a threshold number of timing signals. The method includes determining if a value of the counter is at least equal to or greater than the threshold number. The method still further includes, in response to determining that the value of the counter is at least equal to or greater than the threshold number, generating a composite output signal based on the accumulated recorded output signals.

According to another embodiment, an electronic device includes a display, a sensor circuit having a light sensor associated with the display, and at least one controller communicatively coupled to the display and the light sensor. The at least one controller receives periodic synchronization signals from the display and generates one or more timing signals, based on the received periodic synchronization signals. The at least one controller further tracks, via a counter, a number of timing signals, and in response to each timing signal, records output signals from the light sensor. The output signals correspond to a light level detected by the light sensor. The at least one controller further accumulates the recorded output signals over a threshold number of timing signals. The controller determines if a value of the counter is at least equal to or greater than the threshold number. The at least one controller further, in response to determining that the value of the counter is at least equal to or greater than the threshold number, generates a composite output signal based on the accumulated recorded output signals.

According to an additional embodiment, a computer program product includes a computer readable storage device and program code on the computer readable storage device. When executed within a processor associated with a device, the program code enables the device to provide the various functionality presented in the above-described method processes.

The above contains simplifications, generalizations and omissions of detail and is not intended as a comprehensive description of the claimed subject matter but, rather, is intended to provide a brief overview of some of the functionality associated therewith. Other systems, methods, functionality, features, and advantages of the claimed subject matter will be or will become apparent to one with skill in the art upon examination of the following figures and the remaining detailed written description. The above as well as additional objectives, features, and advantages of the present disclosure will become apparent in the following detailed description.

In the following description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Those of ordinary skill in the art will appreciate that the hardware components and basic configuration depicted in the following figures may vary. For example, the illustrative components within mobile device (100, FIG. 1) are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

FIG. 1 depicts example mobile device 100 within which various aspects of the disclosure can be implemented, according to one or more embodiments. Examples of such mobile devices include, but are not limited to, a laptop computer, a notebook computer, a mobile phone, a digital camera, a tablet computer/device, and a smart-watch. The described features of the disclosure are also applicable to other devices with edge to edge screens or organic light emitting diode (OLED) displays, including but not limited to computer monitors and televisions. Thus, while the described embodiments refer specifically to mobile devices, it is appreciated that the references to mobile device is for example only and that the described features and functionalities apply equally to the other devices, which are not classified as mobile devices. Mobile device 100 includes processor 102, which is communicatively coupled to storage device 104, system memory 120, display 130, image capture device controller 134, wireless communication radios 142a-n, and other components described herein.

Mobile device 100 further includes storage device 104 and system memory 120. System memory 120 may be a combination of volatile and non-volatile memory, such as random access memory (RAM) and read-only memory (ROM). System memory 120 can store program code or similar instructions associated with applications 122, operating system 124, firmware 128, and display module 136. Processor 102 loads and executes program code stored in system memory 120. Examples of program code that may be loaded and executed by processor 102 include program code associated with applications 122 and display module 136.

Display 130 can be one of a wide variety of display screens or devices, such as an OLED display. In the illustrated embodiments, display 130 is a touch screen device that includes a tactile, touch screen interface 131 that allows a user to provide tactile/touch input to or control mobile device 100 by touching the display screen.

In one embodiment, image capture device 132 is communicatively coupled to image capture device controller 134, which is communicatively coupled to processor 102. Image capture device 132 can capture images that are within the field of view of image capture device 132. In one embodiment, image capture device 132 is a rear facing image capture device that faces the back or rear of housing 180.

Radios 142a-n are coupled to antennas 148a-n. Radios 142a-n and antennas 148a-n allow mobile device 100 to communicate wirelessly with external devices 152a-n via wireless network 150. In one embodiment, external devices 152a-n can be radios (i.e., wireless signal transmitters and receivers) located at various cellular communication towers.

Mobile device 100 can further include data port 133, which is connected with processor 102 and charging circuitry 135. Charging circuitry 135 enables external charging of battery 143 via power input through data port 133. Mobile device 100 further includes microphone 108, one or more speakers 144, and one or more physical buttons 107a-n. Buttons 107a-n may provide controls for volume, power, and image capture device 132.

Mobile device 100 further includes motion sensor(s) 161 that are communicatively coupled to processor 102. Motion sensor(s) 161 can detect movement of mobile device 100 and provide motion data to processor 102 that indicate the spatial orientation and movement of mobile device 100. Motion sensor(s) 161 can include one or more accelerometers 162 and gyroscope 163. Accelerometers 162 measure linear acceleration of movement of mobile device 100 in multiple axes (X, Y and Z). In one embodiment, accelerometers 162 can include three accelerometers, where one accelerometer measures linear acceleration in the X axis, one accelerometer measures linear acceleration in the Y axis, and one accelerometer measures linear acceleration in the Z axis. Gyroscope 163 measures rotation or angular rotational velocity of mobile device 100.

Mobile device 100 further includes additional components, such as global positioning system (GPS) module 164 and short-range communication component 147. GPS module 164 can receive location and time data from GPS satellites. Short range communication component 147 is a low powered transceiver that wirelessly communicates with other wireless networks, such as with wireless access point 182. Short range communication component 147 can be a variety of components, such as a near field communication (NFC) device, a Bluetooth device, or a wireless fidelity (Wi-Fi) device. In one embodiment, wireless network 150 can be a mobile phone base station and wireless access point 182 can be a Wi-Fi access point. Mobile device 100 further includes a housing 180 that contains the components of the mobile device.

Mobile device 100 further includes sensor circuit 190 and light sensor 192. Sensor circuit 190 is also communicatively coupled to processor 102 and to light sensor 192 and display 130. Sensor circuit 190 measures light sensor output from light sensor 192, as will be described below. Light sensor 192 can be any of a variety of light sensors that sense a light level and provide an electrical output signal that is representative of the light level. In one embodiment, light sensor 192 can be an ambient light sensor (ALS) that measures the amount of ambient light present. In another embodiment, light sensor 192 can be a proximity sensor that detects the presence of nearby objects. In an additional embodiment, light sensor 192 can be an image capture device that is a front facing image capture device that faces the front of housing 180 and is mounted under or behind display 130.

In the description of each of the following figures, reference is also made to specific components illustrated within the preceding figure(s).

Figure 2:
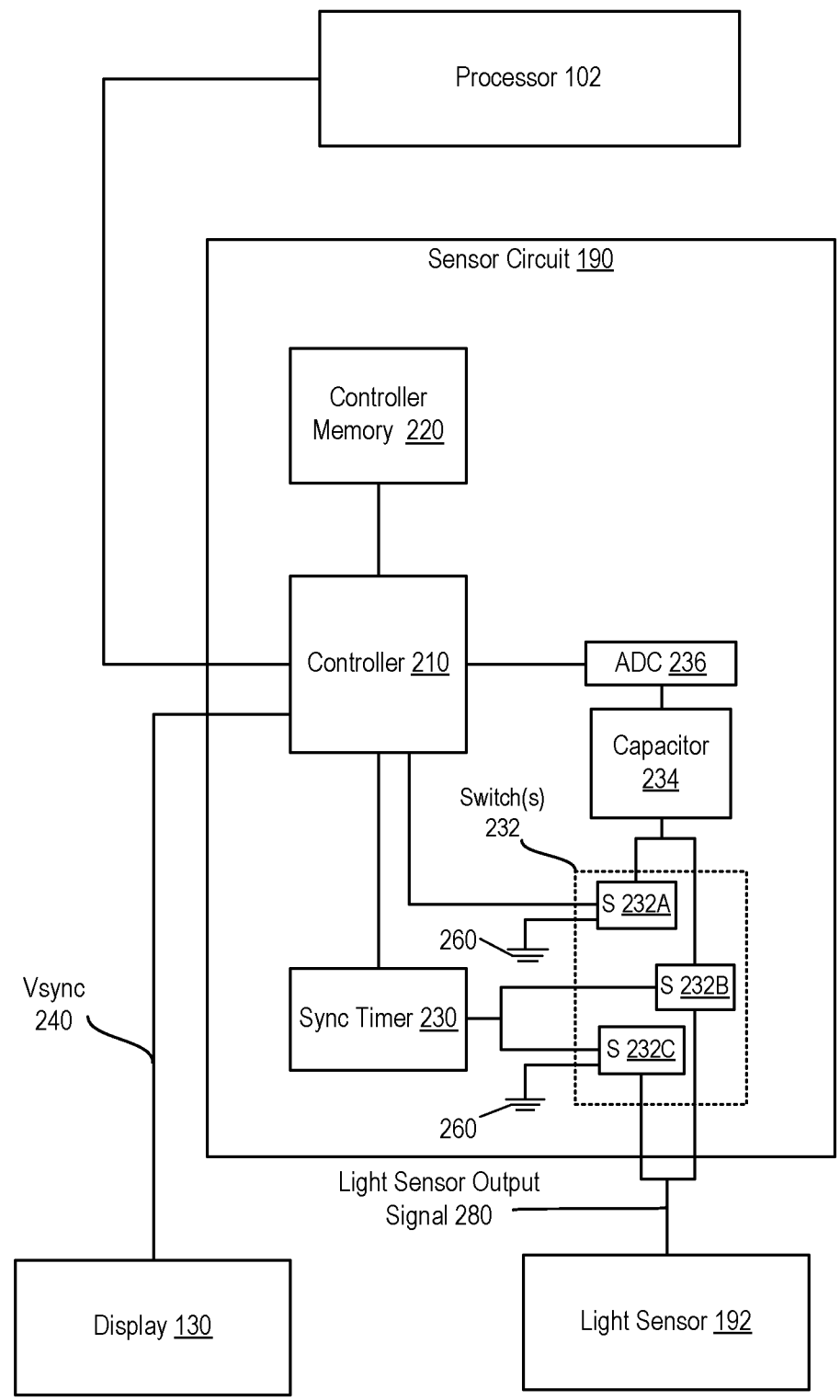
FIG. 2 is a schematic diagram of an example sensor circuit of a mobile device, according to one or more embodiments.

With reference now to FIG. 2, a block diagram representation of one embodiment of sensor circuit 190 is shown. Sensor circuit 190 includes controller 210, which is communicatively coupled to processor 102, display 130, controller memory 220, synchronization timer 230, switch(s) 232 and analog to digital converter (ADC) 236. Sensor circuit 190 includes one or more switch(s) 232, which are coupled to controller 210, synchronization timer 230, light sensor 192 and ADC 236. Switch(s) 232 can include switches 232A, 232B and 232C. Each of switch(s) 232A-C can comprise one or more field effect transistors (FET). Synchronization timer 230 can toggle each of switches 232A-C on (closed) and off (open). Switches 232A-C are open when not closed. Sensor circuit 190 further includes capacitor 234, which is coupled between switch(s) 232 and ADC 236. Switch 232B is coupled between light sensor 192 and capacitor 234 and is controlled by synchronization timer 230. Switch 232B periodically toggles or connects the light sensor output signals 280 of light sensor 192 to capacitor 234. Switch 232B is toggled by synchronization timer 230 to connect light sensor output signals 280 of light sensor 192 to capacitor 234. Light sensor output signals 280 from light sensor 192 are analog signals.

Switch 232A is coupled between capacitor 234 and ground 260 and is controlled by controller 210. Switch 232A is selectively toggled by controller 210 to connect capacitor 234 to ground 260 to enable discharge of capacitor 234 after a pre-determined number of light sensor output signals 280 have been recorded. Switch 232C is coupled between light sensor 192 and ground 260 and is controlled by synchronization timer 230. Switch 232C is toggled by synchronization timer 230 to connect the output of light sensor 192 to ground 260 when capacitor 234 is not accumulating signals from the light sensor. According to one aspect, when the light sensor output signals 280 are not being accumulated by capacitor 234, light sensor 192 is coupled to ground 260, via switch 232C. Coupling light sensor 192 to ground 260 when light sensor output signals 280 are not being accumulated prevents any parasitic capacitance from building charge on capacitor 234 during non-measurement times. Capacitor 234 accumulates light sensor output signals 280 when switch 232B is toggled to a closed position to connect light sensor 192 to capacitor 234. In one embodiment, sensor circuit 190 can be implemented as an application specific integrated circuit (ASIC).

Display 130 periodically generates a vertical synchronization waveform or signal (Vsync) 240 that is transmitted to controller 210. Vsync signal 240 is an electrical signal that prevents screen tearing. Screen tearing occurs when the display 130 and processor 102 work independently, so new frames may be partially rendered when the display shows a frame. In response to Vsync signal 240, processor 102 waits for the display to signal that the display is ready for the next display frame to ensure all displayed frames are always fully drawn.

During operation of display 130, there are small periods of time when display pixels are not being updated and light is not being emitted from the display. This is called blanking or blank time. If the display 130 is driven by a pulse width modulation (PWM) signal, the blank time occurs during PWM off periods. The blank time period is synchronized to occur a pre-determined amount of time after the Vsync signal 240. Accordingly, one feature of this disclosure is that Vsync signal 240 can be used to determine when display 130 is blank or the blank time of display 130.

With reference now to FIG. 3A, one embodiment of example contents of system memory 120 of mobile device 100 is shown. System memory 120 includes data, software, and/or firmware modules, including applications 122, operating system 124, firmware 128, display module 136, and composite output signal 310. Display module 136 enables processor 102 to at least partially control the operation of display 130 including dimming and brightening display 130 based on composite output signal 310 received from sensor circuit 190. Composite output signal 310 is received by processor 102 from sensor circuit 190 and stored to system memory 120. Composite output signal 310 is the accumulated electrical light sensor output signals 280 from light sensor 192 that has been accumulated over several blank time periods. Composite output signal 310 can be used by processor 102, executing display module 136, to perform various functions such as dimming and brightening display 130 in response to ambient light levels.

With reference now to FIG. 3B, one embodiment of example contents of controller memory 220 of sensor circuit 190 is shown. Controller memory 220 includes data, software, and/or firmware modules, including measuring module 320. Measuring module 320 enables the measurement of light sensor output signals 280 from light sensor 192 during time periods when display 130 is off or blank. Light sensor 192 detects an amount of received light and generates corresponding electrical light sensor output signals 280. Measuring module 320 enables recording and accumulating light sensor output during time periods when display 130 is blank. In one embodiment, measurement module 320 enables controller 210 and sensor circuit 190 to perform the processes presented in the flowchart of FIG. 6, as will be described below.

Controller memory 220 further includes counter 330, counter threshold 332, timing signals 334, time period 336 and composite output signal 310'. Counter 330 tracks a number of timing signals 334 that are generated by processor 102. Counter threshold 332 is a threshold number of timing signals 334. Timing signals 334 are pulse width modulated signals that are periodically generated with a pre-determined delay after Vsync signal 240 is received. Time period 336 is an amount of time that switch 232B is toggled to an ON state to connect light sensor 192 to capacitor 234. Time period 336 corresponds to an amount of time that display 130 is blank. Each timing signal 334 is used to toggle switch 232B, in order to connect light sensor 192 to capacitor 234 to allow transfer of the light sensor output signals 280 from light sensor 192 to be stored in capacitor 334 as a corresponding amount of energy. In response to counter 330 reaching a value that is greater than or equal to counter threshold 332, controller 210 triggers ADC 236 to measure the charge stored by capacitor 234 and coverts the measured charge into a digital value that is stored in controller memory 220 as composite output signal 310'. Controller 210 transmits composite output signal 310' to processor 102.

Figure 4A:
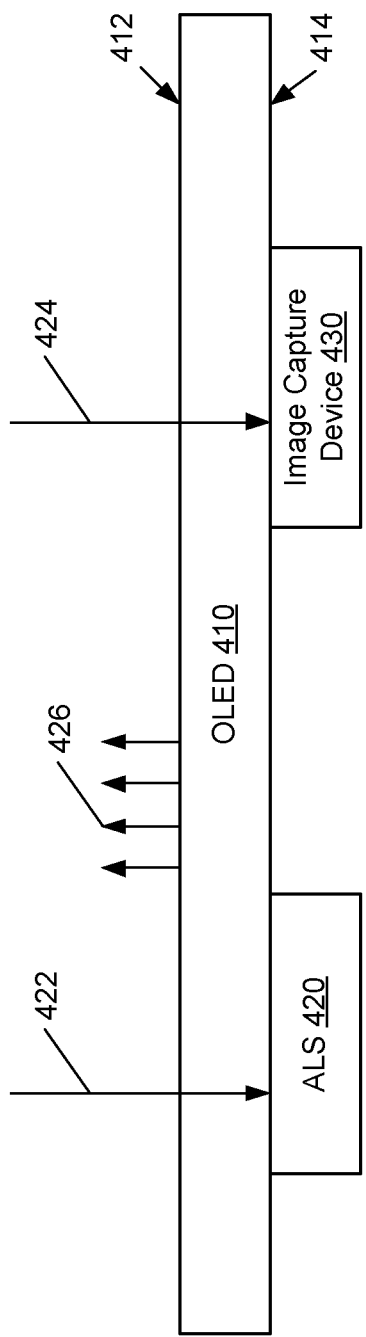
FIG. 4A is a side view of a display and ambient light sensor of a mobile device, according to one or more embodiments.

FIG. 4A illustrates an example of an organic light emitting diode (OLED) display 410 with an ambient light sensor 420 and an image capture device 430. OLED display 410 is an example of display 130 in mobile device 100 of FIG. 1. OLED display 410 has a front surface 412 and a back or rear surface 414. Front surface 412 faces and is viewed by a user of mobile device 100. Light sensors, such as ambient light sensor 420 and image capture device 430 are mounted adjacent to back surface 414. During operation, ambient light 422 passes through OLED display 410, where the ambient light is detected by ambient light sensor 420. Ambient light sensor 420 generates an electrical signal that is proportional to the level or intensity of ambient light 422. Similarly, during operation, image light 424 passes through OLED display 410 where the image light 424 is detected by image capture device 430. Image light 424 is the light reflected off an image that would be captured by image capture device 430. Image capture device 430 generates electrical signals representative of image light 424.

According to one aspect of the disclosure, because emitted light 426 from OLED display 410 interferes with light measurements by an ambient light sensor 420 and image sensing by image capture device 430, operating ambient light sensor 420 and image capture device 430 when OLED display 410 is blank (i.e., not illuminated or emitting light) improves the accuracy of light measurements and image sensing.

Figure 4B:
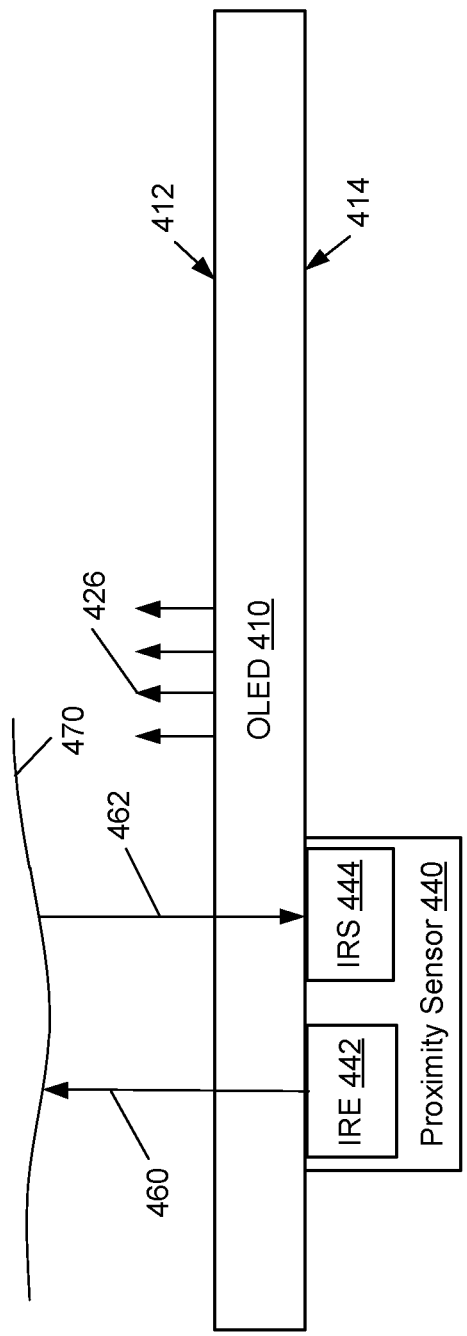
FIG. 4B is a side view of a display and proximity sensor of a mobile device, according to one or more embodiments.

FIG. 4B illustrates an example of an organic light emitting diode (OLED) display 410, with proximity sensor 440. OLED display 410 is an example of display 130 of mobile device 100 of FIG. 1. Light sensors such as proximity sensor 440 are mounted adjacent to the back surface 414. Proximity sensor 440 includes an infrared emitter (IRE) 442 and an infrared sensor (IRS) 444. During operation, infrared emitter 442 generates and transmits infrared light 460 (hereinafter transmitted infrared light 460) that passes through OLED display 410. Transmitted infrared light 460 is reflected off nearby surface 470 of an object as reflected infrared light 462. Reflected infrared light 462 passes through OLED display 410 and is detected by an infrared sensor 444. Proximity sensor 440 generates an electrical signal that is proportional to the level or intensity of reflected infrared light 462. The intensity of reflected infrared light 462 is proportional to the distance of nearby surface 470. Proximity sensor 440 is used to determine if OLED display 410 is in close proximity to nearby surface 470.

According to one aspect of the disclosure, because transmitted infrared light 460 can interfere with the illumination of pixels in OLED display 130, proximity light measurement cycles are synchronized to the display and limited in power and duration, resulting in limited sensitivity for each measurement cycle. Operating proximity sensor 440 using multiple independently synchronized and accumulated light measurement cycles improves the accuracy and sensitivity of proximity sensor measurements.

In one embodiment, controller 210, executing measuring module 320, receives periodic synchronization signals (i.e., Vsync 240) from display 130 of mobile device 100 and generates one or more timing signals 334, based on the received periodic synchronization signals. Controller 210 tracks, via counter 330, a number of the timing signals and, in response to each timing signal, records output signals from light sensor 192 and increments counter 330. The light sensor output signals 280 from light sensor 192 are proportional to a light level detected by light sensor 192. Controller 210 triggers sensor circuit 190 to accumulate the recorded output signals over a threshold number of timing signals and determines if a value of counter 330 is at least equal to or greater than counter threshold 332. In response to determining that the value of counter 330 is at least equal to or greater than counter threshold 332, controller 210, causes sensor circuit 190 to generate a composite output signal 310', based on the accumulated recorded output signals. The composite output signal 310' is transmitted by controller 210 to processor 102.

Figure 5A:
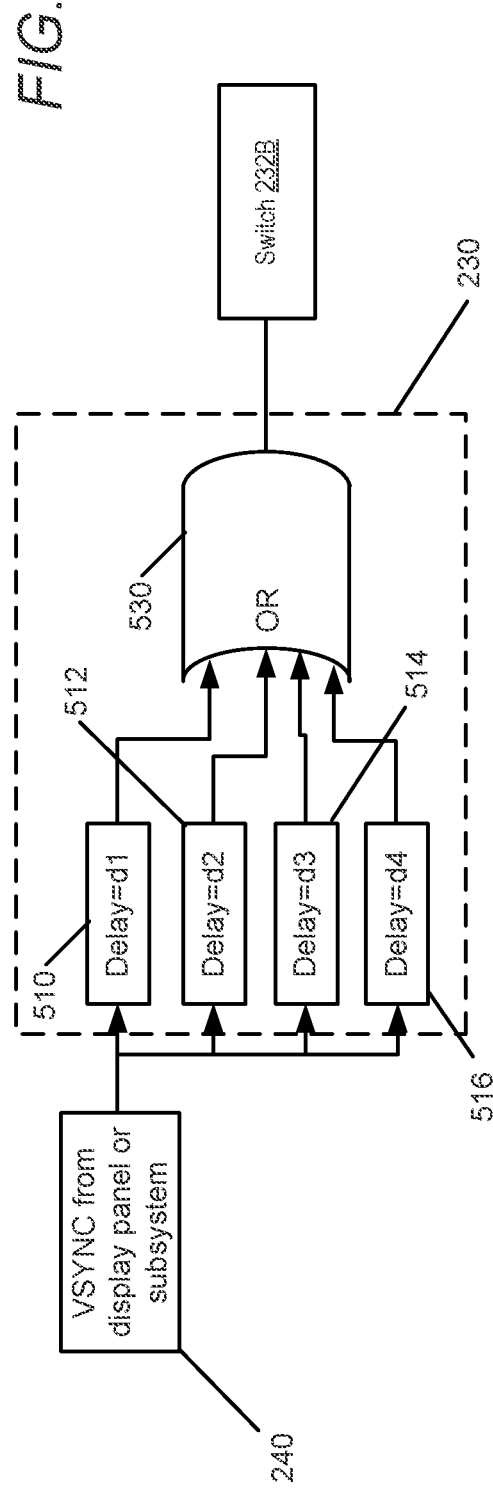
FIG. 5A is an example circuit illustration of periodic synchronization and timing signals of a sensor circuit, according to one or more embodiments.

Turning to FIG. 5A, details of synchronization timer 230 are shown. Synchronization timer 230 includes delay timers 510, 512, 514 and 516 (collectively delay timers 510-516). Each of the delay timers 510-516 has an input coupled to Vsync 240 (via controller 210) and an output coupled to the input of OR gate 530. The output of OR gate 530 is coupled to switch 232B.

Figure 5B:
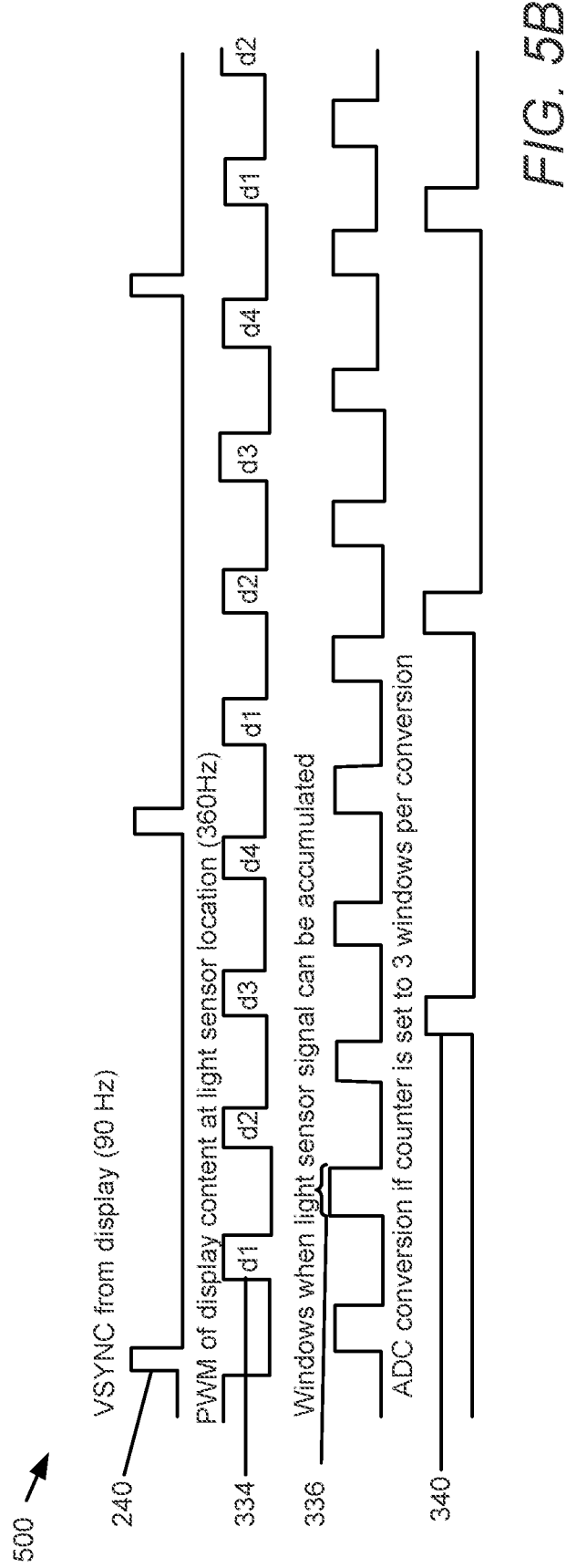
FIG. 5B is a timing diagram providing an example illustration showing details of a synchronization timer, according to one or more embodiments.

With additional reference to FIG. 5B, timing diagram 500 is shown. Timing diagram 500 shows several signals versus time within sensor circuit 190. Timing diagram 500 includes Vsync signals 240, which are periodically generated by display 130. Timing diagram 500 includes timing signals 334 generated by controller 210. Timing diagram 500 further includes time periods 336 when light sensor output signals 280 from the light sensor 192 are accumulated. In one embodiment, Vsync signal 240 can have a frequency of 90 hertz. In response to Vsync signal 240 from controller 210, each delay timer 510-516 generates timing signals 334 that are delayed by an increasing amount of time from Vsync signal 240. Delay timer 510 generates timing signal D1. Delay timer 512 generates timing signal D2. Delay timer 514 generates timing signal D3, and delay timer 516 generates timing signal D4. In one embodiment, the timing signals 334 can have a frequency of 360 hertz.

Each timing signal D1, D2, D3 and D4, provides an output via OR gate 530 that is coupled to switch 232B input and used to toggle switch 232B to an on state (e.g., open state) in order to connect the output of light sensor 192 (FIG. 2) to capacitor 234 (FIG. 2) and thus record and accumulate output signals from light sensor 192. Switch 232B toggles on to transfer the output of light sensor 192 to capacitor 234 during time periods 336 when display 130 is blank. In other words, time periods 336 are time windows during which light sensor output can be accumulated without interference from the operation of display 130. After a pre-determined number of timing signals 334 (i.e., counter threshold 332), ADC 236 (FIG. 2) can be triggered to generate composite output signal 310' from the recorded and accumulated output signals on capacitor 234. In one embodiment, counter threshold 332 can have a value of three timing signals such that light sensor output signals 280 of light sensor 192 is recorded and accumulated at capacitor 234 for three time periods 336, before ADC 236 generates composite output signal 310'.

Figure 6:
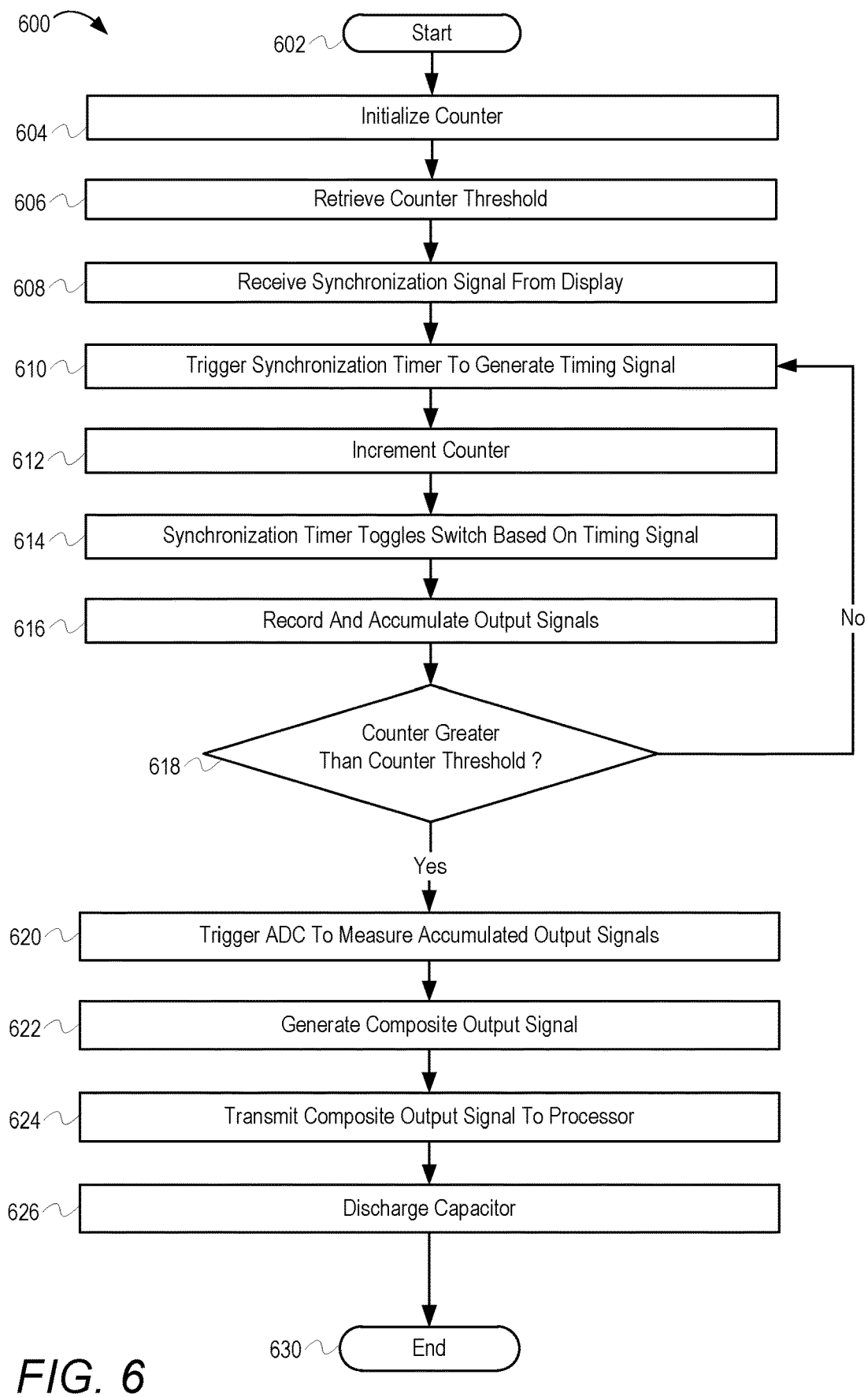
FIG. 6 depicts a flowchart of a method of accurately measuring light sensor output in an electronic or mobile device with an OLED display, according to one or more embodiments.

FIG. 6 depicts a method 600 for measuring light sensor output in an electronic device. The description of method 600 will be described with reference to the components and examples of FIGS. 1-5B. The operations depicted in FIG. 6 can be performed by mobile device 100 or other suitable devices configured with one or more light sensors. One or more of the processes of the methods described in FIG. 6 may be performed by a controller (e.g., controller 210) of mobile device 100 executing program code associated with measuring module 320.

Method 600 begins at start block 602. At block 604, controller 210 initializes counter 330 by setting counter 330 to a value of zero. Controller 210 retrieves counter threshold 332 and time period 336 from controller memory 220 (block 606). Controller 210 receives Vsync signal 240 from display 130 (block 608). Controller 210 triggers synchronization timer 230 to generate one or more timing signals 334 based on Vsync signal 240 (block 610). For each timing signal 334, controller 210 increments counter 330 (block 612). Controller 210 causes switch 232B to toggle in response to each timing signal 334 (block 614). For each timing signal 334, controller 210 causes switch 232B to remain closed for time period 336 and then opens. After time period 336 ends, controller 210 causes synchronization timer 230 to toggle switch 232C to connect the output of light sensor 192 to ground 260 when capacitor 234 is not accumulating signals from the light sensor.

In one embodiment, controller 210 passes Vsync signal 240 to synchronization timer 230 to use in the generation of timing signals 334. As switch 232B is toggled on, output signals from light sensor 192 are connected to capacitor 234 where the light sensor output signals 280 (i.e., value of sensed ambient light level) are stored and accumulated (block 616). Switch 232B connects capacitor 234 to the output of light sensor 192 when display 130 is blank (i.e., during each time period 336). The charge on capacitor 234 increases each time switch 232B is toggled on while there is light detected by sensor 192. The light sensor output signals 280 from light sensor 192 correspond to a light level (which is sensed as indicative of ambient light) detected by the light sensor 192.

At decision block 618, controller 210 determines if the value of counter 330 is greater than or equal to the value of counter threshold 332. In response to determining that the value of counter 330 is not greater than or equal to the value of counter threshold 332, controller 210 continues to trigger synchronization timer 230 to generate one or more timing signals 334 based on Vsync signal 240 (block 610). In response to determining that the value of counter 330 is greater than or equal to (>) the value of counter threshold 332, controller 210 triggers ADC 236 to sense the accumulated output signals (i.e., charge) on capacitor 234 (block 620) and to generate a digital composite output signal 310' corresponding to the measured accumulated output signals (block 622). Controller 210 transmits composite output signal 310' to processor 102 (block 624). Controller 210 clears the accumulated output signals by discharging capacitor 334. As provided at block 626, controller 210 causes switch 232A to toggle to a position which connects capacitor 234 to ground 260 in order to discharge capacitor 334 (block 626). Method 600 then terminates at end block 630.

According to one aspect of the disclosure, because light emitted from OLED display 410 interferes with light measurements by light sensor 192, operating light sensor 192 when OLED display 410 is blank improves the accuracy of light measurements.

According to another aspect of the disclosure, because each individual time period 336 (during which display 130 is blank or off) is shorter than the time needed to collect enough analog light sensor output signals for ADC 236 to digitize, light sensor output signals 280 from light sensor 192 are recorded and accumulated over multiple time periods 336. The accumulation of light sensor output signals 280 for multiple time periods 336 allows the collection of enough analog light sensor output signals for ADC 236 to digitize.

In the above-described method of FIG. 6, one or more of the method processes may be embodied in a computer readable device containing computer readable code such that operations are performed when the computer readable code is executed on a computing device. In some implementations, certain operations of the methods may be combined, performed simultaneously, in a different order, or omitted, without deviating from the scope of the disclosure. Further, additional operations may be performed, including operations described in other methods. Thus, while the method operations are described and illustrated in a particular sequence, use of a specific sequence or operations is not meant to imply any limitations on the disclosure. Changes may be made with regards to the sequence of operations without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object-oriented programming language, without limitation. These computer program instructions may be provided to a processor of a general-purpose computer, special-purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

As used herein, the term "or" is inclusive unless otherwise explicitly noted. Thus, the phrase "at least one of A, B, or C" is satisfied by any element from the set {A, B, C} or any combination thereof, including multiples of any element.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

What is claimed is:

1. A method comprising:
   receiving, via a sensor circuit, periodic synchronization signals from a display of a device;
   generating one or more timing signals based on the received periodic synchronization signals;
   tracking, via a counter, a number of the timing signals;
   in response to each timing signal, recording output signals from a light sensor, the output signals corresponding to a light level detected by the light sensor;
   accumulating the recorded output signals over a threshold number of timing signals;
   determining if a value of the counter is at least equal to or greater than the threshold number; and
   in response to determining that the value of the counter is at least equal to or greater than the threshold number, generating a composite output signal based on the accumulated recorded output signals.

2. The method of claim 1, further comprising:
   in response to determining that the value of the counter is not at least equal to or greater than the threshold number, continuing recording and accumulating the output signals from the light sensor; and
   in response to the counter value being at least equal to the threshold number, resetting the counter and clearing the accumulated recorded output signals.

3. The method of claim 1, wherein recording output signals from the light sensor and accumulating the recorded output signals further comprises:
   during each timing signal, toggling a switch, for a first time period, to couple the light sensor to a capacitor to enable forwarding of the recorded output signals from the light sensor to the capacitor for accumulation of the recorded output signals; and
   in response to an end of the first time period, toggling the switch to uncouple the capacitor from the light sensor.

4. The method of claim 1, wherein generating the timing signals further comprises:
   receiving, via a synchronization timer, the periodic synchronization signals; and
   generating pulse width modulated (PWM) timing signals based on the periodic synchronization signals, wherein the output signals from the light sensor are recorded during time periods corresponding to the PWM timing signals.

5. The method of claim 1, wherein generating the composite output signal further comprises:

receiving, via an analog to digital converter, the accumulated recorded output signals;
converting the accumulated recorded output signal to a composite output signal;
transmitting the composite output signal to a processor of the device.

6. The method of claim 1, wherein recording the output signals from the light sensor occurs when at least one area of the display is blank.

7. The method of claim 1, wherein the light sensor is one of an ambient light sensor, a proximity sensor, and an image capture device.

8. The method of claim 1, wherein the light sensor is mounted behind the display.

9. An electronic device comprising:
a display;
a sensor circuit comprising a light sensor associated with the display; and
at least one controller communicatively coupled to the display and the light sensor, the at least one controller enabled to:
receive periodic synchronization signals from the display;
generate one or more timing signals based on the received periodic synchronization signals;
track, via a counter, a number of timing signals;
in response to each timing signal, recording output signals from the light sensor, the output signals corresponding to a light level detected by the light sensor;
accumulate the recorded output signals over a threshold number of timing signals;
determine if a value of the counter is at least equal to or greater than the threshold number; and
in response to determining that the value of the counter is at least equal to or greater than the threshold number, generate a composite output signal based on the accumulated recorded output signals.

10. The electronic device of claim 9, wherein in response to determining that the counter is not greater than the counter threshold, the controller is further enabled to:
continue recording output signals from the light sensor and accumulating the recorded output signals; and
in response to the counter value being at least equal to the threshold number, resetting the counter and clearing the accumulated recorded output signals.

11. The electronic device of claim 9, wherein:
the sensor circuit comprises a capacitor and a switch that selectively couples the capacitor to an output of the light sensor; and
to record output signals from the light sensor and accumulate the recorded output signals, the controller toggles the switch to couple the output signals from the light sensor to the capacitor, for a first time period, during each timing signal; and
in response to an end of the first time period, toggles the switch to uncouple the capacitor from the light sensor.

12. The electronic device of claim 9, wherein:
the sensor circuit further comprises a synchronization timer that receives the periodic synchronization signals; and
the timing signals are pulse width modulated (PWM) timing signals, generated by the synchronization timer, based on the periodic synchronization signals, wherein the output signals from the light sensor are recorded during time periods corresponding to the PWM timing signals.

13. The electronic device of claim 9, further comprising a processor and wherein:
the sensor circuit further comprises an analog to digital converter; and
to generate the composite output signal, the controller:
receives, via the analog to digital converter, the accumulated recorded output signals;
converts the accumulated recorded output signals to a composite output signal; and
transmits the composite output signal to the processor of the device.

14. The electronic device of claim 9, wherein the sensor circuit records the output signals from the light sensor when at least one area of the display is blank.

15. The electronic device of claim 9, wherein the light sensor is one of an ambient light sensor, a proximity sensor, and an image capture device.

16. The electronic device of claim 9, wherein the light sensor is mounted behind the display.

17. A computer program product comprising:
a computer readable storage device with program code stored thereon which, when executed by one or more controllers of an electronic device having a display, a sensor circuit, a light sensor, a processor, and a memory, enables the electronic device to complete the functionality of:
receiving, via the sensor circuit, periodic synchronization signals from the display;
generating one or more timing signals based on the received periodic synchronization signals;
tracking, via a counter, a number of timing signals;
in response to each timing signal, recording output signals from the light sensor, the output signals corresponding to a light level detected by the light sensor;
accumulating the recorded output signals over a threshold number of timing signals;
determining if a value of the counter is at least equal to or greater than the threshold number; and
in response to determining that the value of the counter is at least equal to or greater than the threshold number, generating a composite output signal based on the accumulated recorded output signals.

18. The computer program product of claim 17, wherein the program code further enables the electronic device to complete the functionality of:
in response to determining that the value of the counter is not at least equal to or greater than the threshold number, continuing recording and accumulating the output signals from the light sensor; and
in response to the counter value being at least equal to the threshold number, resetting the counter and clearing the accumulated recorded output signals.

19. The computer program product of claim 17, wherein the program code further enables the electronic device to complete the functionality of:
during each timing signal, toggling a switch, for a first time period, to couple the light sensor to a capacitor to enable forwarding of the recorded output signals from the light sensor to the capacitor for accumulation of the recorded output signals; and
in response to an end of the first time period, toggling the switch to uncouple the capacitor from the light sensor.

20. The computer program product of claim 17, wherein the program code further enables the electronic device to complete the functionality of:
receiving, via a synchronization timer, the periodic synchronization signals; and the timing signals are pulse width modulated (PWM) timing signals, generated by the synchronization timer, based on the periodic synchronization signals, wherein the output signals from the light sensor are recorded during time periods corresponding to the PWM timing signals.

* * * * *